United States Patent
Sugita et al.

(10) Patent No.: US 6,304,706 B1
(45) Date of Patent: Oct. 16, 2001

(54) PLANAR LIGHTWAVE CIRCUIT

(75) Inventors: Akio Sugita; Akimasa Kaneko; Mikitaka Itoh, all of Ibaraki-ken (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/390,490

(22) Filed: Sep. 3, 1999

(30) Foreign Application Priority Data

Sep. 3, 1998 (JP) .................................................. 10-248883

(51) Int. Cl.[7] .................................. G02B 6/10; G02B 6/12
(52) U.S. Cl. .............................. 385/129; 385/14; 385/45; 385/130; 385/131; 385/132
(58) Field of Search ......................... 385/45, 14, 129–132

(56) References Cited

U.S. PATENT DOCUMENTS 5,127,081    6/1992   Koren et al. ......................... 385/130
6,222,966 *  4/2001   Khan et al. ........................... 385/45

FOREIGN PATENT DOCUMENTS

| 2-113209 | 4/1990 | (JP) . |
| 4-70605  | 3/1992 | (JP) . |
| 9-73021  | 3/1997 | (JP) . |
| 10-48444 | 2/1998 | (JP) . |

* cited by examiner

Primary Examiner—Evelyn A Lester
(74) Attorney, Agent, or Firm—Blakely Sokoloff Taylor & Zafman

(57) ABSTRACT

This planar lightwave circuit includes a buried layer formed in a region between at least two cores branching from a branching point to decrease in thickness as the spacing between the cores increases with an increase in distance from the branching point. The planar lightwave circuit is designed to suppress scattering of light signals at the branching point.

7 Claims, 6 Drawing Sheets

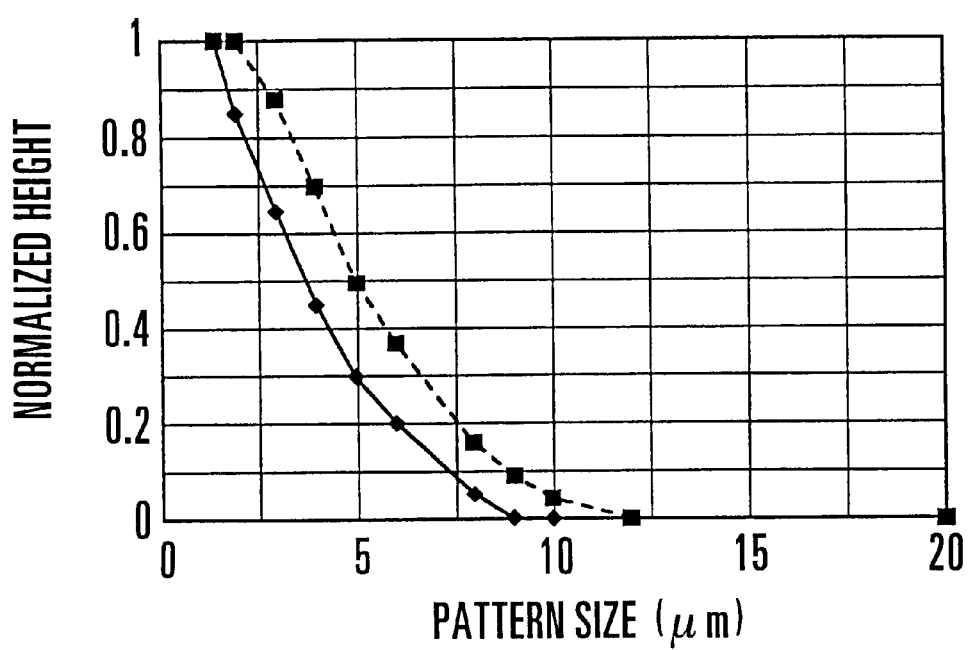
F I G. 3

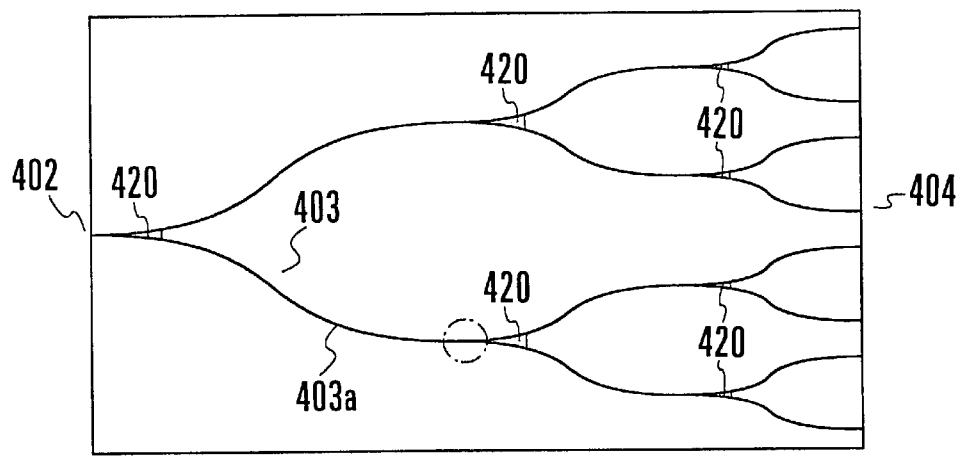
F I G. 4
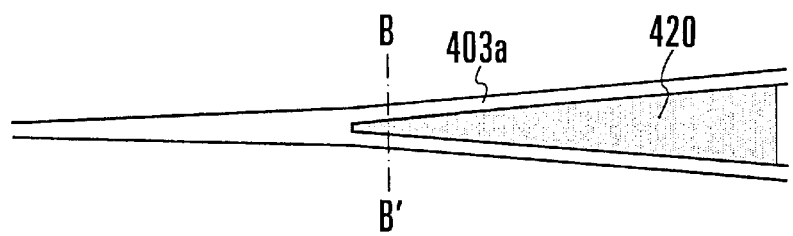
F I G. 5
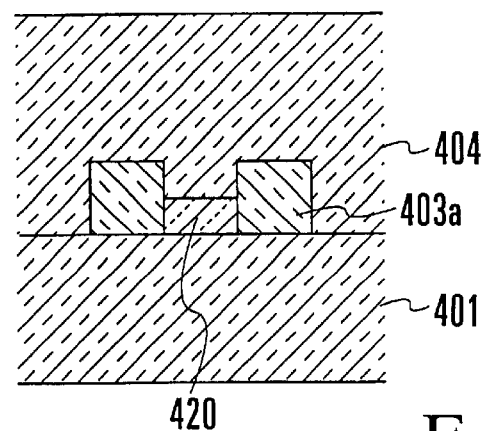
F I G. 6

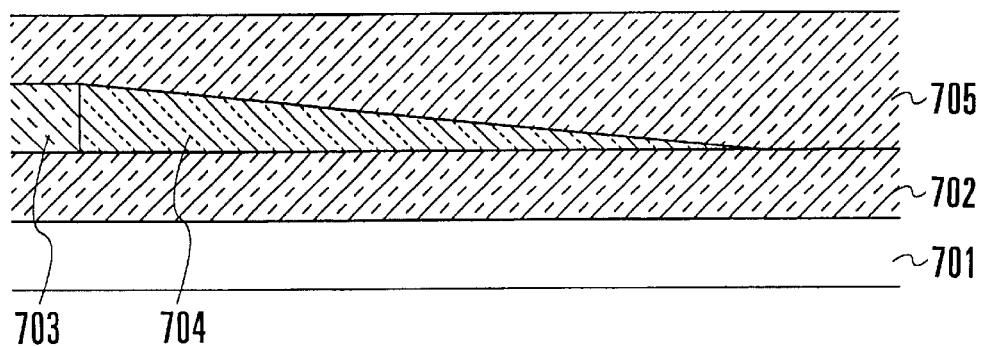
F I G. 7
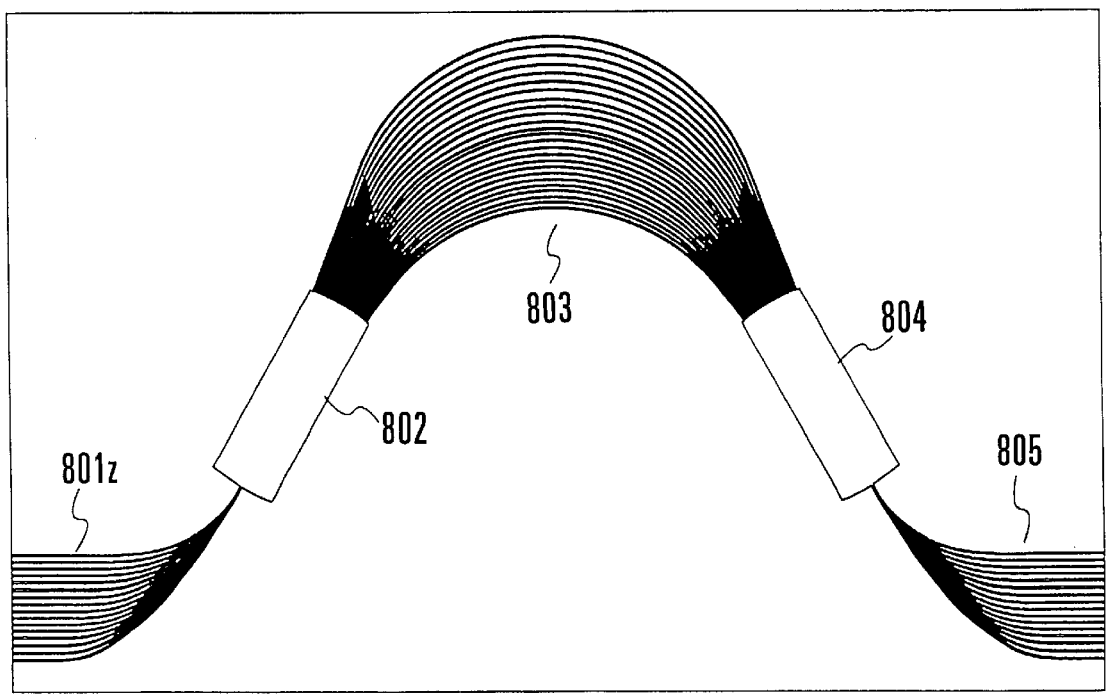
F I G. 8

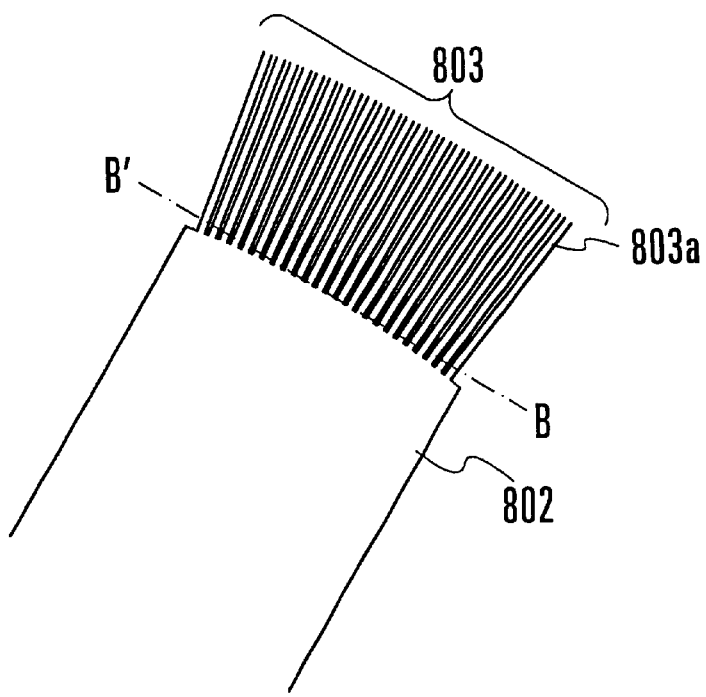
F I G. 9
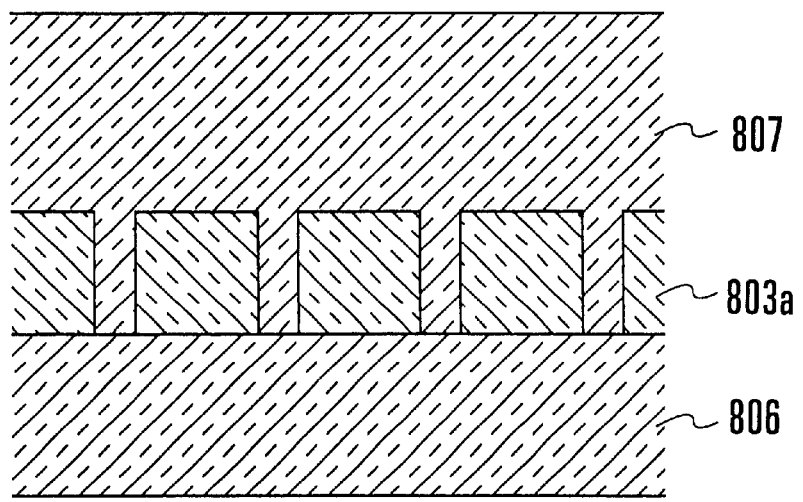
F I G. 10

PLANAR LIGHTWAVE CIRCUIT

BACKGROUND OF THE INVENTION

The present invention relates to a planar lightwave circuit and, more particularly, to a planar lightwave circuit having regions sandwiched between a plurality of waveguides like a star or Y-branching waveguide.

Conventionally, a planar lightwave circuit formed on a planar substrate can have various functions such as multiplexing/demultiplexing, optical branching, and optical switching, and hence is expected as a practical optical device or component. A multi/demultiplexer and optical branching circuit, in particular, are expected as passive parts important for a wavelength multiplexing network system and access network.

FIGS. 8 to 10 show an arrayed-waveguide grating multi/demultiplexer using silica glass for a planar lightwave circuit. FIG. 8 shows the arrayed-waveguide grating multi/demultiplexer. FIG. 9 shows part of the arrayed-waveguide grating multi/demultiplexer. FIG. 10 shows part of a cross section taken along a line B–B' in FIG. 9.

As shown in FIG. 8, in this arrayed-waveguide grating multi/demultiplexer, first of all, signal light incident from input waveguides 801 is expanded in an input-side slab waveguide 802 and strikes an arrayed waveguide 803. In the arrayed waveguide 803, since optical path length differences are set between the adjacent waveguides, the signal light which is guided through the arrayed waveguide 803 and incident on an output-side slab waveguide 804 has phase differences. The signal light is therefore focused and demultiplexed by different output waveguides 805 depending on the wavelengths satisfying diffraction conditions.

In the arrayed waveguide 803, as shown in FIGS. 9 and 10, cores 803a are clearly separated from each other. In the connection portion between the arrayed waveguide 803 and the input-side slab waveguide 802 or output-side slab waveguide 804, spacings on the $\mu$m order are formed between the cores 803a. As shown in FIG. 10, each core 803a is sandwiched between lower and upper clads 806 and 807 made of silica glass having a refractive index lower than that of the core 803a, thereby forming an optical waveguide.

As described above, a multi/demultiplexer and optical branching circuit are expected as passive components important for a wavelength multiplexing network system and access network. It is essential for these passive components that the propagation loss of light signals is as low as possible.

In the conventional arrayed-waveguide grating multi/demultiplexer shown in FIG. 8, however, there are spacings on the $\mu$m order are formed between the respective cores 803a at the connection region between the cores 803a constituting the arrayed waveguide 803 and the input-side slab waveguide 802. For this reason, part of incident signal light from the input-side slab waveguide 802 to the arrayed waveguide 803 is scattered through the spacings of the $\mu$m order. The propagation loss of signal light due to this scattering is as large as 50% of the total loss.

As described above, in a conventional circuit in which signal light branches, such as an arrayed-waveguide grating multi/demultiplexer, signal light is scattered through the spacings between the branching cores. Hence, a propagation loss occurs.

According to a reference (C. van Dam, A.A.M. Staring et al., "Loss reduction for phased-array demultiplexers using a double etch technique" Integrated Photonics Research 1996 Boston, Mass., April 29–May 2, pp. 52–55), in an InGaAsP-based arrayed-waveguide grating multi/demultiplexer, a transition region is formed on the boundary between a slab waveguide and an arrayed waveguide by etching halves of cores so as to reduce the propagation loss of signal light. Even if, however, this structure is applied to glass-based waveguides, the propagation loss reducing effect is very small.

In addition, according to this technique, in a lithography process of transferring a circuit pattern, etching must be performed twice after a mask is accurately aligned, resulting in a complicated process.

According to another reference (Jerry C. Chen and C Dragone, "A Proposed Design for Ultralow-Loss Waveguide Grating Routers", IEEE Photon. Technol. Lett., vol. 10, pp. 379–381, March, 1998), a simulation result is reported, which indicates that a reduction in loss can be attained by optimizing a circuit configuration. However, the above problem of scattering of signal light still remains unsolved.

As described above, when signal light is to be branched or demultiplexed from one waveguide or slab waveguide into a plurality of waveguides, the spacings between the respective waveguides at the branching point are ideally 0 in terms of the loss of light.

However, photolithography and etching techniques used in the process of forming waveguides have their own limits of resolution, and the spacings between the respective waveguides (cores), e.g., glass-based waveguides, at the branching point are about 1 $\mu$m or more. For this reason, in a conventional planar lightwave circuit, an excess waveguide loss occurs at such a branching portion or demultiplexing portion. Demands have therefore arisen for a reduction in loss at the portion.

SUMMARY OF THE INVENTION

It is, therefore, an object of the present invention to reduce the propagation loss of light at a branching point of waveguides constituting a planar lightwave circuit and a peripheral portion of the branching point.

In order to achieve the above object, according to an aspect of the present invention, there is provided a planar lightwave circuit comprising a plurality of nonparallel adjacent waveguides constituting a branching waveguide, and buried layers arranged between the adjacent waveguides, wherein the waveguides are made up of cores and surrounding clads, the buried layers are formed, in tight contact, between the cores to extend from a branching point from which the cores of the adjacent waveguides branch and to decrease in thickness as spacings between the cores of the adjacent waveguides increase with an increase in distance from the branching point, a refractive index of the buried layer is higher than that of the clad, and a refractive index of the core is not less than that of the buried layer.

With this arrangement, the refractive index of each of the portions between the adjacent cores branching from the branching point gradually decreases with an increase in distance from the branching point.

BRIEF DESCRIPTION OF THE DRAWINGS

FIG. 3 is a graph showing the etching characteristics of a material for buried layers in a manufacturing method according to the first embodiment of the present invention;

FIG. 4 is a plan view showing the overall structure of a planar lightwave circuit according to the second embodiment of the present invention;

FIG. 5 is a sectional view showing part of the structure of the planar lightwave circuit according to the second embodiment of the present invention;

FIG. 6 is a sectional view showing part of the structure of the planar lightwave circuit according to the second embodiment of the present invention;

FIG. 7 is a sectional view showing part of the structure of a planar lightwave circuit according to the fourth embodiment of the present invention;

FIG. 8 is a plan view showing the structure of an arrayed-waveguide grating multi/demultiplexer;

FIG. 9 is a plan view showing part of the structure of the arrayed-waveguide grating multi/demultiplexer; and FIG. 10 is a sectional view showing part of the structure of the arrayed-waveguide grating multi/demultiplexer.

DESCRIPTION OF THE PREFERRED EMBODIMENTS

The embodiments of the present invention will be described in detail below with reference to the accompanying drawings.

First Embodiment

Figure 1A:
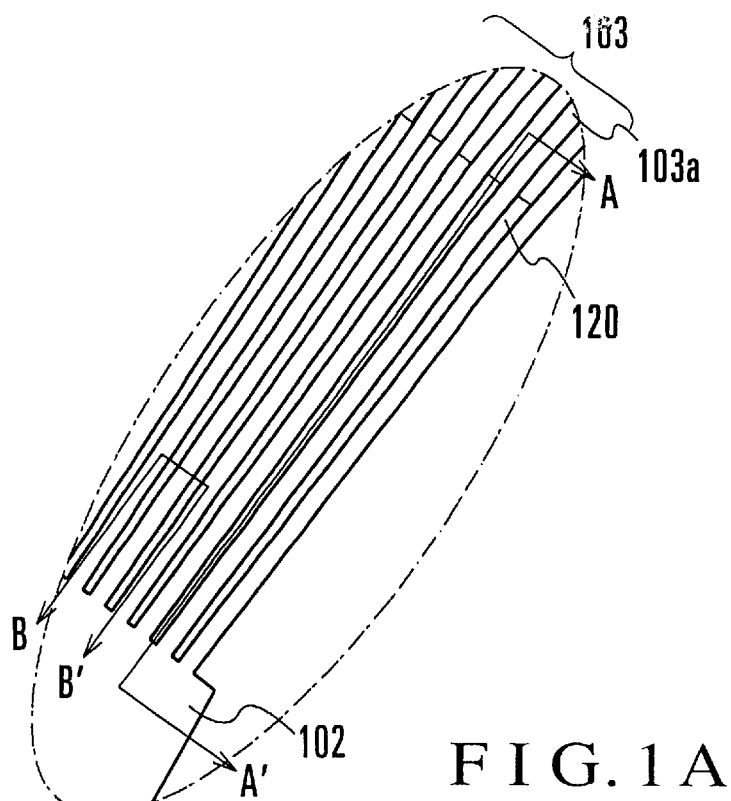
FIGS. 1-A, 1-B, and 1-C are a plan view and sectional views, respectively, showing part of the structure of a planar lightwave circuit according to the first embodiment of the present invention.
Figure 1B:
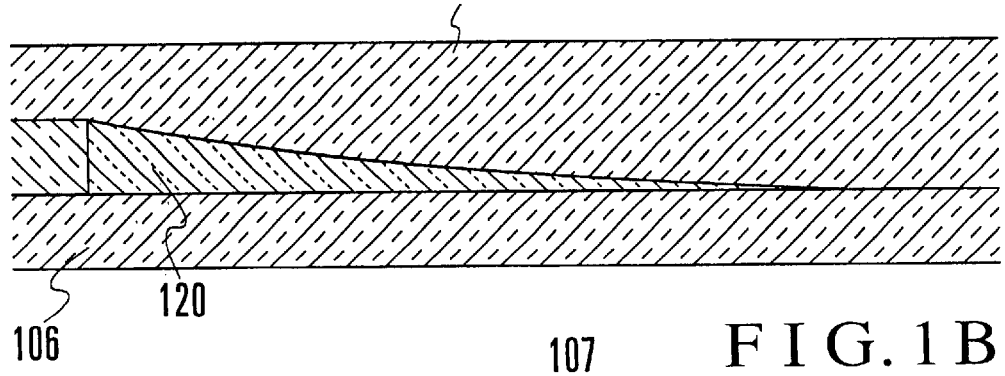
Figure 1C:
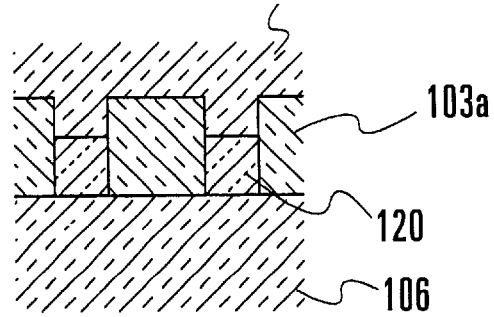

The first embodiment of the present invention will be described below by taking a planar lightwave circuit used in an arrayed-waveguide grating multi/demultiplexer as an example. As shown in FIG. 1-A, in the first embodiment, buried layers 120 made of the same material as that for cores 103a are formed in the regions between the adjacent cores 103a of an arrayed waveguide 103 extending from an input-side slab waveguide 102. As shown in FIGS. 1-B and 1-C, each buried layer 120 is formed between a lower clad layer 106 and an upper clad layer 107 in the region between the adjacent cores 103a. The height of the buried layer 120 decreases with an increase in distance from the input-side slab waveguide 102.

Figure 2:
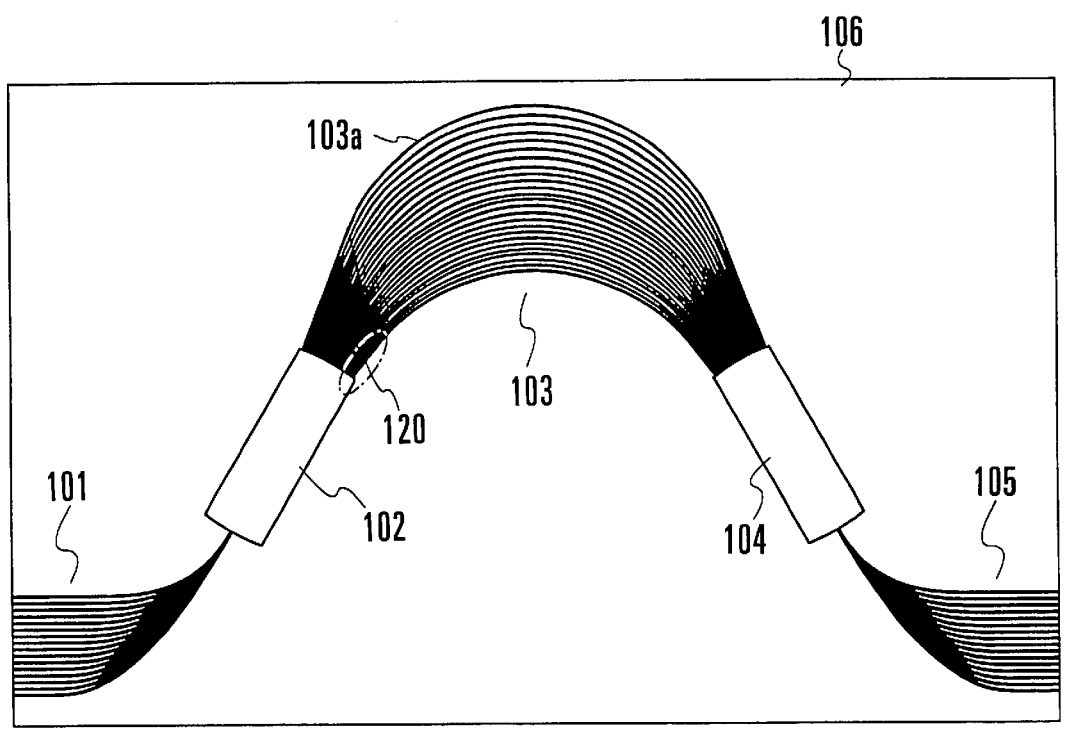
FIG. 2 is a plan view showing the overall structure of the planar lightwave circuit according to the first embodiment of the present invention.

FIG. 1-A shows the region of the arrayed-waveguide grating multi/demultiplexer in FIG. 2 which is indicated by the chain line ellipse. Signal light incident from input waveguides 101 is expanded in the input-side slab waveguide 102 and strikes the arrayed waveguide 103. The signal light is guided through the arrayed waveguide 103 to strike an output-side slab waveguide 104. The signal light is then focused by different output waveguides 105 depending on the wavelengths to be demultiplexed. FIGS. 1-B and 1-C show the portion in FIG. 1-A.

In general, the field is different between these slab waveguides and the arrayed waveguide. For this reason, in a conventional planar lightwave circuit, signal light incident from the slab waveguide into the arrayed waveguide scatters. Part of the signal light radiates through the gaps between cores.

In the planar lightwave circuit of the first embodiment, however, the buried layers 120 made of the same material as that for the cores 103a are formed between the adjacent cores 103a of the arrayed waveguide 103. In addition, the thickness of each buried layer 120 decreases with an increase in distance from the connection point of the input-side slab waveguide 102. For this reason, the electromagnetic field distribution gradually changes in the connection portion between the input-side slab waveguide 102 and the arrayed waveguide 103. In the planar lightwave circuit of the first embodiment, therefore, light propagating through the input-side slab waveguide 102 strikes the arrayed waveguide 103 without radiating in the connection portion of the arrayed waveguide 103. This makes it possible to realize a reduction in loss in the arrayed waveguide 103. In addition, when signal light propagating through the arrayed waveguide 103 is to be incident on the input-side slab waveguide 102 (or output-side slab waveguide 104), a reduction in loss can be attained as in the above case.

A method of manufacturing the above planar lightwave circuit of the first embodiment will be briefly described next.

First of all, a glass film is deposited by a deposition method using a flame hydrolytic reaction using $SiCl_4$ as a material, a sputtering method using a target such as $SiO_2$, a CVD method using silane, or the like, thereby forming the lower clad layer 106. A glass layer for forming cores is then formed by the same deposition method as described above, and a resist pattern having a desired shape is formed on the glass layer by a known photolithography technique. The glass layer is selectively etched by reactive ion etching using the resist pattern as a mask, thereby forming cores such as the cores 103a and input-side slab waveguide 102.

In this case, the buried layers 120 are also formed at the same time. In the conventional fabrication process, in the reactive ion etching step of forming the pattern of the above cores 103a, all unnecessary portions are removed by etching regardless of the sizes of the patterns. In contrast to this, in the first embodiment, the film residue ratio of the glass layer to be removed can be accurately controlled between 0 and 1 depending on the spacings between the adjacent patterns by a combination of the exposure condition for the resist pattern, the type of gas used for etching, the mixing ratio of gases, the gas pressure in etching, and RF power for generating a plasma in etching. For example, as shown in FIG. 3, the film residue ratio (normalized height) of the region between the cores 103a under two types of etching condition depends on the pattern spacing (pattern size). As is obvious from FIG. 3, the smaller the pattern spacing, i.e., the spacing between the adjacent cores 103a, the higher the film residue ratio.

As described above, after the cores 103a and the buried layers 120 are formed, the upper clad layer 107 may be formed to cover them.

The following are the specifications of the planar lightwave circuit of the first embodiment manufactured by the above method. The dimensions of a cross section of the core 103a was 6 $\mu$m×6 $\mu$m; and the spacing between the cores 103a at the junction between the input-side slab waveguide 102 and the cores, 2.5 $\mu$m. The maximum height of the buried layer 120 between the cores 103a was 5.8 $\mu$m. A length L at which the height of the buried layer 120 becomes 0 was 600 $\mu$m. At this time, the spacing between the cores 103a was 10 $\mu$m. The relative refractive index difference between the core 103a, the lower clad layer 106, and the upper clad layer 107 was 0.75%.

In this case, the height of the buried layer 120 has a slope that falls off linearly or exponentially. When the slope linearly falls off, an angle θ of the slope may satisfy 0.25°≦θ≦2.0°. Assume that the slope exponentially falls off. In this case, if the slope shape is represented by exp(-αL), 0.001≦α≦0.04 may be satisfied. In the first embodiment, the buried layer 120 is formed such that the slope exponentially falls off, the value α is set to 0.004.

When an arrayed-waveguide grating multi/demultiplexer with a channel spacing of 100 GHz and 32 channels was manufactured by using the waveguides of the first embodiment formed in the above manner, the insertion loss was 1.3 dB, which was smaller than the insertion loss, 2.8 dB, in the prior art by 1.5 dB.

In the first embodiment, the buried layers 120 are made of the same material as that for the cores 103a. However, these components need not be made of the same material. Other transparent materials within the following refractive index range may be used as long as the electromagnetic field distributions in the connection portions of the arrayed waveguide 103 gradually change. It suffices if the selected materials satisfy $n_c < n_g \leq n_o$ where $n_g$ is the refractive index of the buried layer 120, $n_o$ is the refractive index of the core 103a, and $n_c$ is the refractive index of the lower clad layer 106 and upper clad layer 107.

Second Embodiment

The second embodiment of the present invention will be described next. In the second embodiment, a planar lightwave circuit is applied to a Y-branching 1×8 splitter circuit. As shown in FIG. 4, in the second embodiment, signal light is input from the input end of an input waveguide 402 formed on a lower clad 401. This signal light is guided by a waveguide 403 of the Y-branching 1×8 splitter circuit and output from the output end of an output waveguide 404.

For example, in a Y-branching portion, e.g., the region enclosed with the circle in FIG. 4, a buried layer 420 made of the same material as that for the core 403a is formed in the region between the two branching cores 403a, as shown in the enlarged view of FIG. 5. When viewed at, for example, the cross section taken along a line B–B' in FIG. 5, the buried layer 420 is sandwiched between the two branching cores 403a on the lower clad 401, as shown in FIG. 6. The upper clad 404 is formed to cover these components.

In this case, each core 403a is formed to have a square cross section having a size of 6 μm×6 μm. The two cores 403a are spaced apart from each other by 2.0 μm at the branching point. The buried layer 420 is formed at the branching point to have a height of 5.0 μm. This height decreases to 0 at a distance of 500 μm from the branching point. The above value α is therefore about 0.012. At the position where the height of the buried layer 420 is 0, the spacing between the two branching cores 403a is about 9 μm. Note that the relative refractive index difference between the core 403a, the lower clad 401, and the upper clad 404 is 0.75%.

In the second embodiment, the loss per Y-branching portion is obtained as follows. First of all, the insertion loss of the planar lightwave circuit in FIG. 4 in the second embodiment is 10.3 dB. The overall loss of the planar lightwave circuit based on a loss of 3 dB per Y-branching portion is 9 dB, and the propagation loss and the connection loss with respect to the input/output fiber are 1 dB. The loss per Y-branching portion is therefore 0.1 dB. This insertion loss is smaller than the loss per Y-branching portion in the conventional Y-branching 1×8 splitter circuit, which is 0.8 dB, by 0.7 dB.

This planar lightwave circuit of the second embodiment can be manufactured by the same method as that for the planar lightwave circuit of the first embodiment described above.

In the second embodiment, as in the first embodiment, the same material as that for the cores need not be used for the buried layers. Other materials can be used as long as they satisfy $n_c < n_g \leq n_o$ where $n_g$ is the refractive index of the buried layer, $n_o$ is the refractive index of the core, and $n_c$ is the refractive index of the lower and upper clad layers.

Third Embodiment

The third embodiment of the present invention will be described next.

In the third embodiment, a planar lightwave circuit had the following structure. This is an arrayed-waveguide grating multi/demultiplexer having 64 channels. A cross section of each core of the arrayed waveguide was 5 μm wide and 4.5 μm high. The spacing between cores at the joint surface between the slab waveguide and the arrayed waveguide was set to 1.0 μm. Buried layers are formed between the adjacent cores. The maximum height of each buried layer at the joint surface was set to 4.5 μm. The length at which the height of the buried layer was 0 was set to 550 μm. The above value a was therefore about 0.01. At the position where the buried layer was 0, the spacing between the adjacent cores was 8 μm. In the third embodiment, the relative refractive index difference between the core and the clad was 1.45%. Note that the basic arrangement is almost the same as that of each of the embodiments shown in FIGS. 1-A, 1-B, 1-C, and 2.

The planar lightwave circuit of the third embodiment can also be manufactured by the same method as that used for the first and second embodiments. A glass layer is formed by a deposition method using a flame hydrolytic reaction using $SiCl_4$ or the like as a material, a sputtering method using a target such as $SiO_2$, a CVD method using silane, or the like. A resist pattern having a desired shape is then formed on the glass layer by a known photolithography technique. The glass layer is selectively etched by, for example, reactive ion etching using the resist pattern as a mask, thereby forming cores. Thereafter, an upper clad is formed to cover these cores.

The planar lightwave circuit of the third embodiment manufactured in the above manner had an insertion loss of 2.5 dB. Since the insertion loss of the planar lightwave circuit manufactured by the conventional method is 4.5 dB, the insertion loss in the third embodiment is improved by 2.0 dB.

Fourth Embodiment

The fourth embodiment of the present invention will be described next. The fourth embodiment will be described by taking an arrayed-waveguide grating multi/demultiplexer with a channel spacing of 200 GHz and 16 channels as an example.

In the fourth embodiment, a planar lightwave circuit had the following structure. A cross section of each core of the arrayed waveguide was 6 μm wide and 6 μm high. The spacing between cores at the joint surface between the slab waveguide and the arrayed waveguide was set to 1.5 μm. Buried layers are formed between the adjacent cores. The maximum height of each buried layer on the joint surface was set to 6.0 μm. The length at which the height of the buried layer was 0 was set to 750 μm. Note that the basic arrangement is almost the same as that of each of the embodiments shown in FIGS. 1-A, 1-B, 1-C, and 2.

In the fourth embodiment, as shown in FIG. 7, the height of a buried layer 704 extending from a core 703 of a slab waveguide on a lower clad 702 formed on a substrate 701 linearly decreases. In this case, an angle θ of the slope of the buried layer 704 is 0.46°. FIG. 7 shows a cross section taken along a line A–A' in FIG. 1, and no core of the arrayed waveguide is shown. At the position where the height of the buried layer 704 becomes 0, the spacing between the adjacent cores of the arrayed waveguide is 11 μm. In the fourth embodiment, the relative refractive index difference between the buried layer 704 and clads 702 and 705 was set to 0.6%. The relative refractive index difference between the core 703, the lower clad 702, and an upper clad 705 was set to 0.75%. In addition, the thicknesses of the lower clad 702 and upper clad 705 were 20 μm and 25 μm, respectively.

In the fourth embodiment, the above planar lightwave circuit was formed by using a transparent organic material. This manufacturing method will be briefly described. First of all, a silicone deuteride coating was formed on the substrate 701 by spin coating or the like, and the coating was heated to remove the solvent, thereby forming the lower clad 702 on the substrate 701.

A silicone deuteride film was then formed on the lower clad 702 by spin coating, and a desired resist pattern was formed on this film by a known photolithography technique. Note that the silicone deuteride used for the clad is fluorinated, and the refractive index of the clad can be controlled by changing the fluorination ratio.

The above film was patterned by reactive ion etching with an etching gas containing a fluorocarbon-based gas as a main component using the resist pattern as a mask, thereby forming the cores of the arrayed waveguide and the cores 703 of the slab waveguide on the lower clad 702. In dry etching for the formation of these cores, all the regions other than the cores were removed by etching.

An ultraviolet-curing resin containing epoxy as a main component was formed on the lower clad 702 by spin coating or the like. At this time, the viscosity or the like of the resin was adjusted to make the resultant resin film have the following thickness. The thickness of the resin film at the position where the spacing between the cores of the arrayed waveguide, which was already formed, was 1.5 μm was twice the thickness of the resin film formed on a flat portion on which no patterns such as cores were formed. After the resin film was cured upon radiation of ultraviolet rays, reactive ion etching using oxygen as an etching gas was performed until no resin film was left on the flat portion, thus forming the buried layers 704 between the cores.

The upper surface of the resultant structure was coated with silicone deuteride to form the upper clad 705. With this process, the planar lightwave in circuit of the fourth embodiment was formed.

The planar lightwave circuit of the fourth embodiment manufactured in the above manner had an insertion loss of 4.6 dB. Since the insertion loss of a similar structure manufactured by the conventional method was 5.6 dB, the insertion loss in the fourth embodiment was improved by 1.0 dB.

According to the above description, silicone deuteride and an ultraviolet-curing resin are used as transparent organic materials used for the clads and cores. However, the present invention is not limited to this. The following arrangement may be used.

As in the above case, silicone deuteride is used for clads and cores, and may also be used for buried layers. In this case, a planar lightwave circuit may be manufactured in the same manner as in the first embodiment.

In addition, as a transparent organic material, polymethyl methacrylate, polymethyl methacrylate deuteride, or fluorinated polyimide may be used. When fluorinated polyimide is used, the refractive index can be controlled by changing the fluorination ratio.

As has been described above, a planar lightwave circuit of the present invention includes a plurality of nonparallel adjacent waveguides constituting a branching waveguide and buried layers formed between the adjacent waveguides. The buried layers are formed, in tight contact, between the cores to extend from the branching point from which the cores of the adjacent waveguides branch. In addition, the thickness of each buried layer decreases as the spacings between the cores of the adjacent waveguides increase with an increase in distance from the branching point. The refractive index of the buried layer is higher than that of the clad, and the refractive index of the core is equal to or higher than that of the buried layer.

With this arrangement, the refractive index of the portion between two cores branching from the branching point gradually decreases. According to the present invention, therefore, scattering of light signals at the branching point can be suppressed, and the propagation loss of light can be reduced.

What is claimed is:

1. A planar lightwave circuit comprising:
   a plurality of nonparallel adjacent waveguides constituting a branching waveguide; and
   buried layers arranged between said adjacent waveguides,
   wherein said waveguides are made up of cores and surrounding clads,
   said buried layers are formed, in tight contact, between the cores to extend from a branching point from which the cores of said adjacent waveguides branch and to decrease in thickness as spacings between the cores of said adjacent waveguides increase with an increase in distance from the branching point,
   a refractive index of said buried layer is higher than that of the clad, and
   a refractive index of the core is not less than that of said buried layer,
   wherein the thickness of said buried layer linearly decreases from the branching point with a slope of said buried layer falling within a range of 0.25° (inclusive) to 2° (inclusive).

2. A circuit according to claim 1, wherein the thickness of said buried layer exponentially decreases from the branching point with α falling within a range of 0.001 (inclusive) to 0.004 (inclusive) when a distance from the branching point is represented by L and a slope shape is expressed as $\exp(-\alpha L)$.

3. A planar lightwave circuit comprising:
   a plurality of nonparallel adjacent waveguides constituting at branching waveguide; and
   buried layers arranged between said adjacent waveguides,
   wherein said waveguides are made up of cores and surrounding clads,
   said buried layers are formed, in tight contact, between the cores to extend from a branching point from which the cores of said adjacent waveguides branch and to decrease in thickness as spacings between the cores of said adjacent waveguides increase with an increase in distance from the branching point,
   a refractive index of said buried layer is higher than that of the clad, and
   a refractive index of the core is not less than that of said buried layer,
   wherein said waveguide is made of silica-based glass containing silica glass as a main component.

4. A planar lightwave circuit comprising:
   a plurality of nonparallel adjacent waveguides constituting a branching waveguide; and
   buried layers arranged between said adjacent waveguides,
   wherein said waveguides are made up of cores and surrounding clads,
   said buried layers are formed, in tight contact, between the cores to extend from a branching point from which the cores of said adjacent waveguides branch and to decrease in thickness as spacings between the cores of said adjacent waveguides increase with an increase in distance from the branching point, a refractive index of said buried layer is higher than that of the clad, and a refractive index of the core is not less than that of said buried layer, wherein said waveguide is made of a transparent organic material.

5. A circuit according to claim 4, wherein the transparent organic material is a material selected from the group consisting of polymethyl methacrylate, polymethyl methacrylate deuteride, silicone deuteride, fluorinated polyimide, and epoxy resin.

6. A circuit according to claim 4, wherein the core is made of silicone deuteride, and said buried layer is made of an ultraviolet-curing resin containing epoxy.

7. A planar lightwave circuit comprising:

a plurality of nonparallel adjacent waveguides constituting a branching waveguide; and buried layers arranged between said adjacent waveguides, wherein said waveguides are made up of cores and surrounding clads, said buried layers are formed, in tight contact, between the cores to extend from a branching point from which the cores of said adjacent waveguides branch and to decrease in thickness as spacings between the cores of said adjacent waveguides increase with an increase in distance from the branching point, a refractive index of said buried layer is higher than that of the clad, and a refractive index of the core is not less than that of said buried layer, wherein said waveguide constitute an arrayed waveguide grating.

* * * * *